US011346647B2

(12) United States Patent
Hwang

(10) Patent No.: US 11,346,647 B2
(45) Date of Patent: May 31, 2022

(54) SHAPE MEASUREMENT DEVICE

(71) Applicant: Jae Eun Hwang, Changwon-si (KR)

(72) Inventor: Jae Eun Hwang, Changwon-si (KR)

( * ) Notice: Subject to any disclaimer, the term of this patent is extended or adjusted under 35 U.S.C. 154(b) by 49 days.

(21) Appl. No.: 16/969,187

(22) PCT Filed: Nov. 13, 2018

(86) PCT No.: PCT/KR2018/013757
§ 371 (c)(1),
(2) Date: Aug. 11, 2020

(87) PCT Pub. No.: WO2019/156315
PCT Pub. Date: Aug. 15, 2019

(65) Prior Publication Data

US 2020/0370875 A1 Nov. 26, 2020

(30) Foreign Application Priority Data

Feb. 12, 2018 (KR) ........................ 10-2018-0016635

(51) Int. Cl.
*G01B 5/20* (2006.01)
*G01B 5/016* (2006.01)

(52) U.S. Cl.
CPC ............... *G01B 5/20* (2013.01); *G01B 5/016* (2013.01)

(58) Field of Classification Search
None
See application file for complete search history.

(56) References Cited

U.S. PATENT DOCUMENTS 4,377,911 A * 3/1983 Iida .......................... G01B 7/28 33/551
6,164,124 A * 12/2000 Fujii ........................ G01B 7/34 33/551
6,772,527 B1 * 8/2004 Butter ................. G01B 11/007 33/503
6,874,243 B2 * 4/2005 Hama ..................... G01B 5/28 33/551

(Continued)

FOREIGN PATENT DOCUMENTS

DE 202017007159 U1 * 10/2019 ............... G01B 5/28
JP 2000-146566 A 5/2000

(Continued)

*Primary Examiner* — Christopher W Fulton
(74) *Attorney, Agent, or Firm* — Maschoff Brennan

(57) ABSTRACT

A shape measurement device includes a stylus configured to contact an object to be measured; a measurement arm that supports the stylus to allow the stylus to contact the object to be measured; a measurement arm part that supports the measurement arm; and a measurement arm support that supports the measurement arm part to allow the stylus to move along an outer shape of the object to be measured. The measurement arm support includes a support body provided with a movement rail formed on a top surface thereof. A body coupling block is coupled to the movement rail to move along the movement rail and is detachably coupled to the measurement arm part. The measurement arm portion includes a body provided with a block accommodation groove to accommodate the body coupling block and a position-fixing member coupled to a lower surface of the body defining the block accommodation groove.

6 Claims, 7 Drawing Sheets

(56) References Cited

U.S. PATENT DOCUMENTS 8,701,301 B2 * 4/2014 Nakayama .......... G01B 5/0016
33/554
9,891,033 B2 * 2/2018 Onodera ................. G01B 5/28
10,928,177 B2 * 2/2021 Steuer ................... G01B 5/016

FOREIGN PATENT DOCUMENTS

JP 2004-125699 A 4/2004
JP 5854249 B1 12/2015
KR 10-1217217 B1 12/2012
KR 10-1546835 B1 8/2015

* cited by examiner

【FIG.1】 --Prior Art--
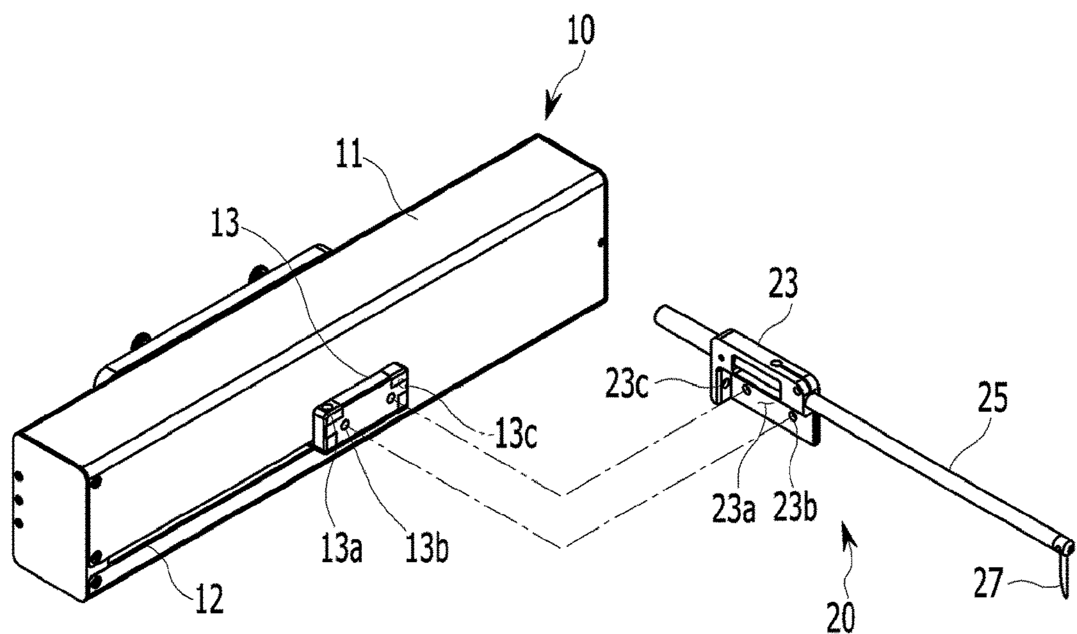
【FIG.2】 --Prior Art--
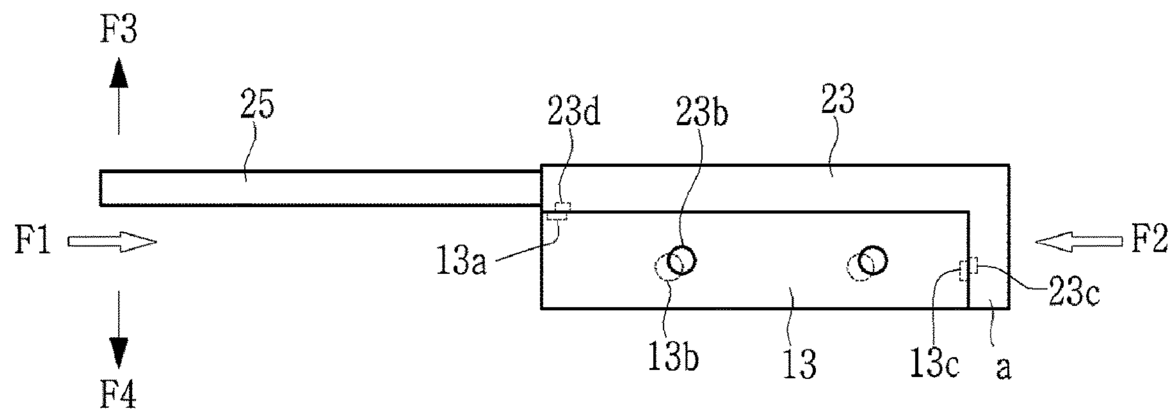

【FIG.3】
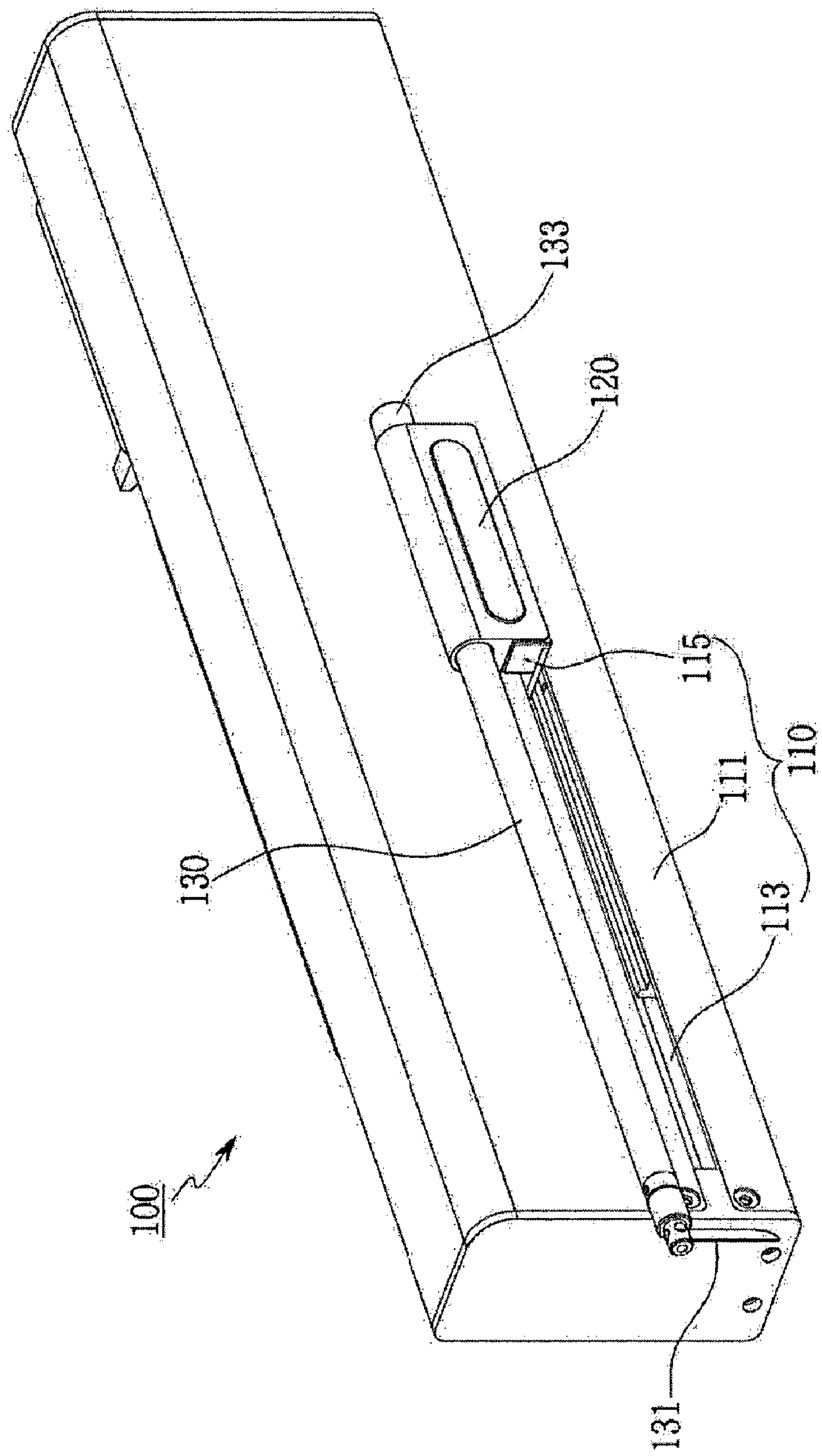

【FIG.4】
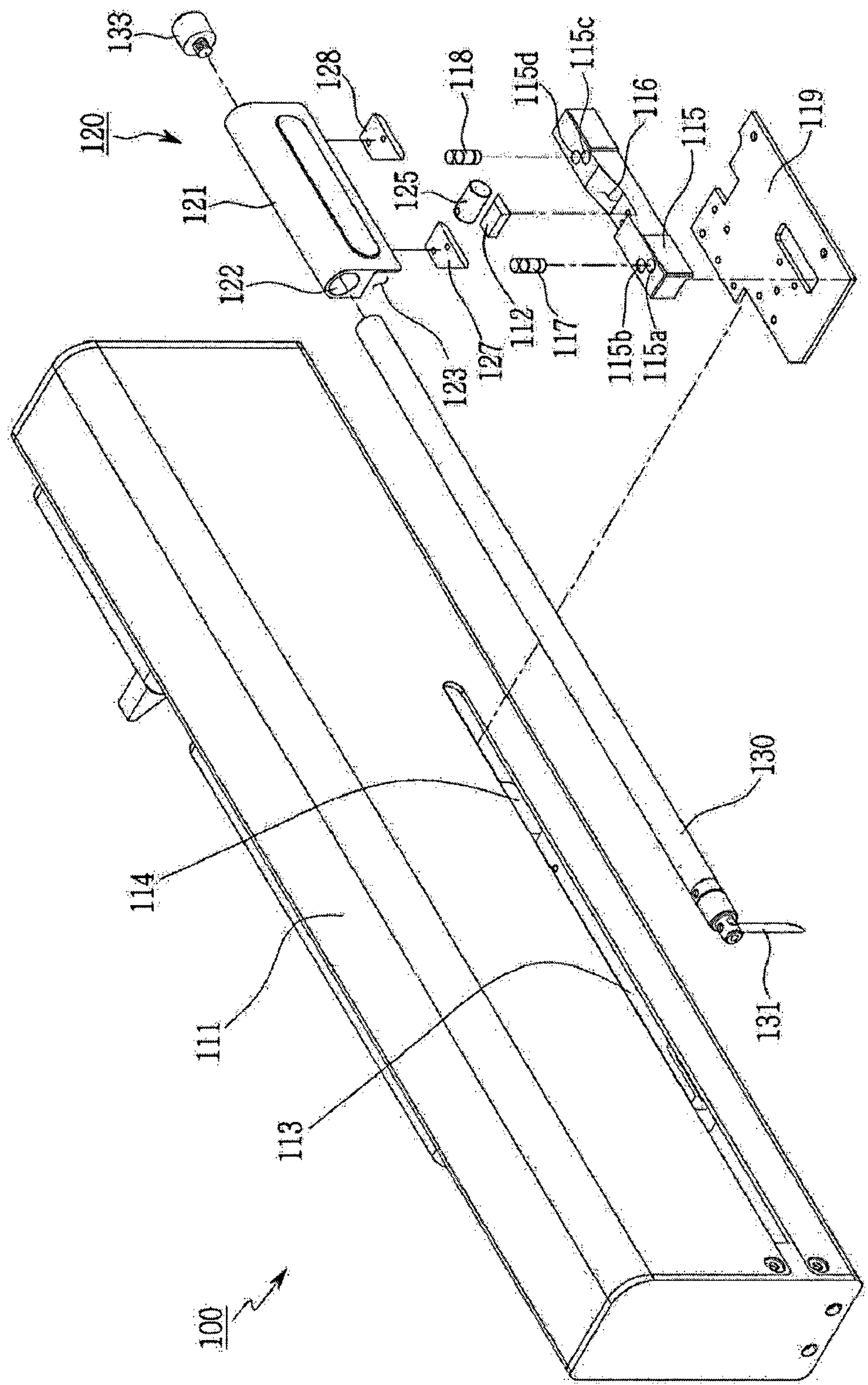

[FIG.5]
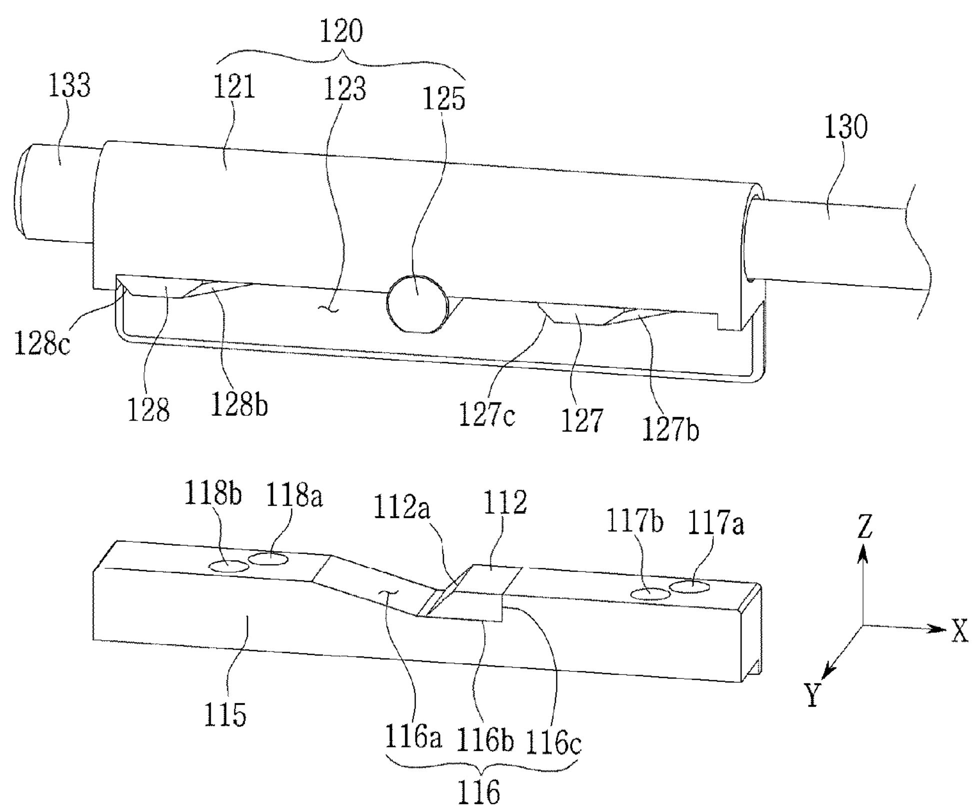

【FIG.6】
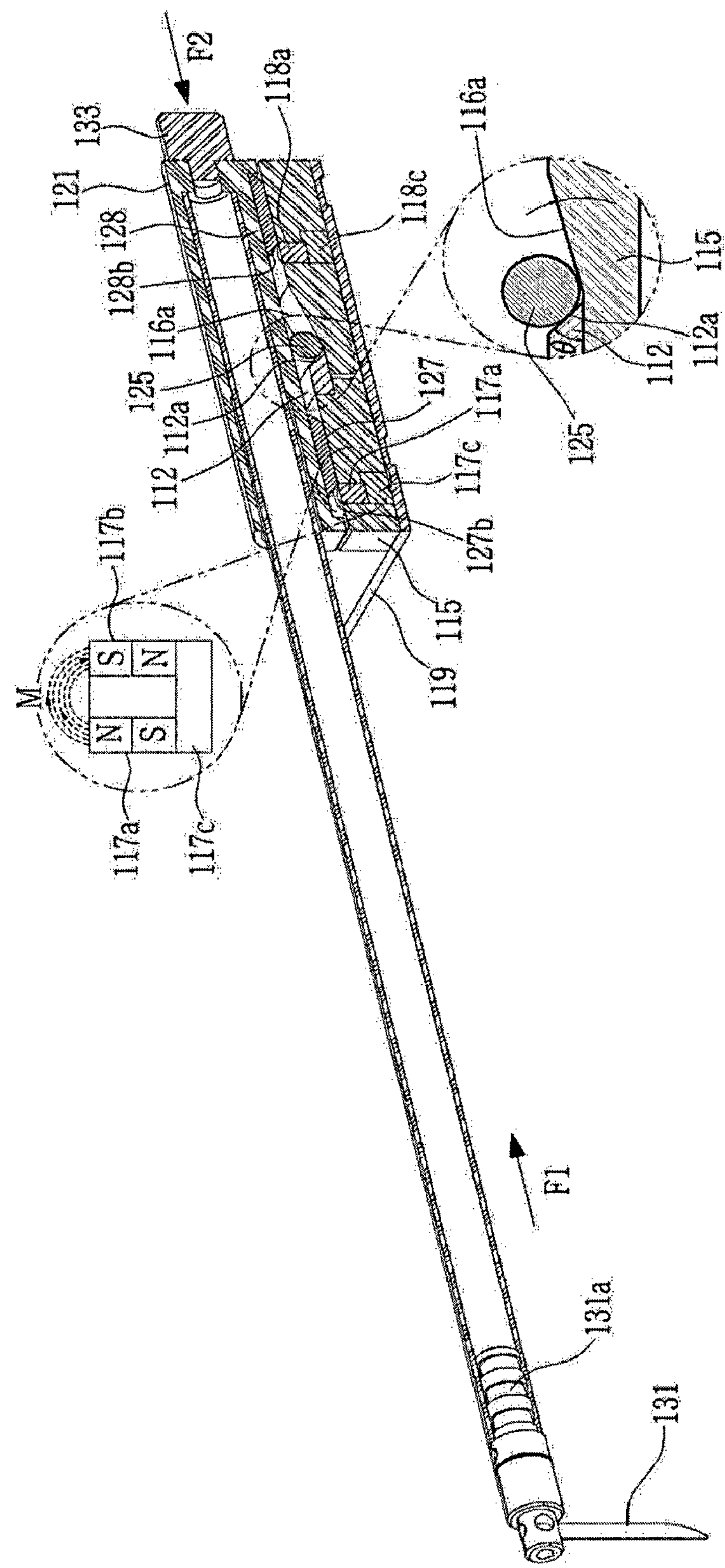

【FIG.7】
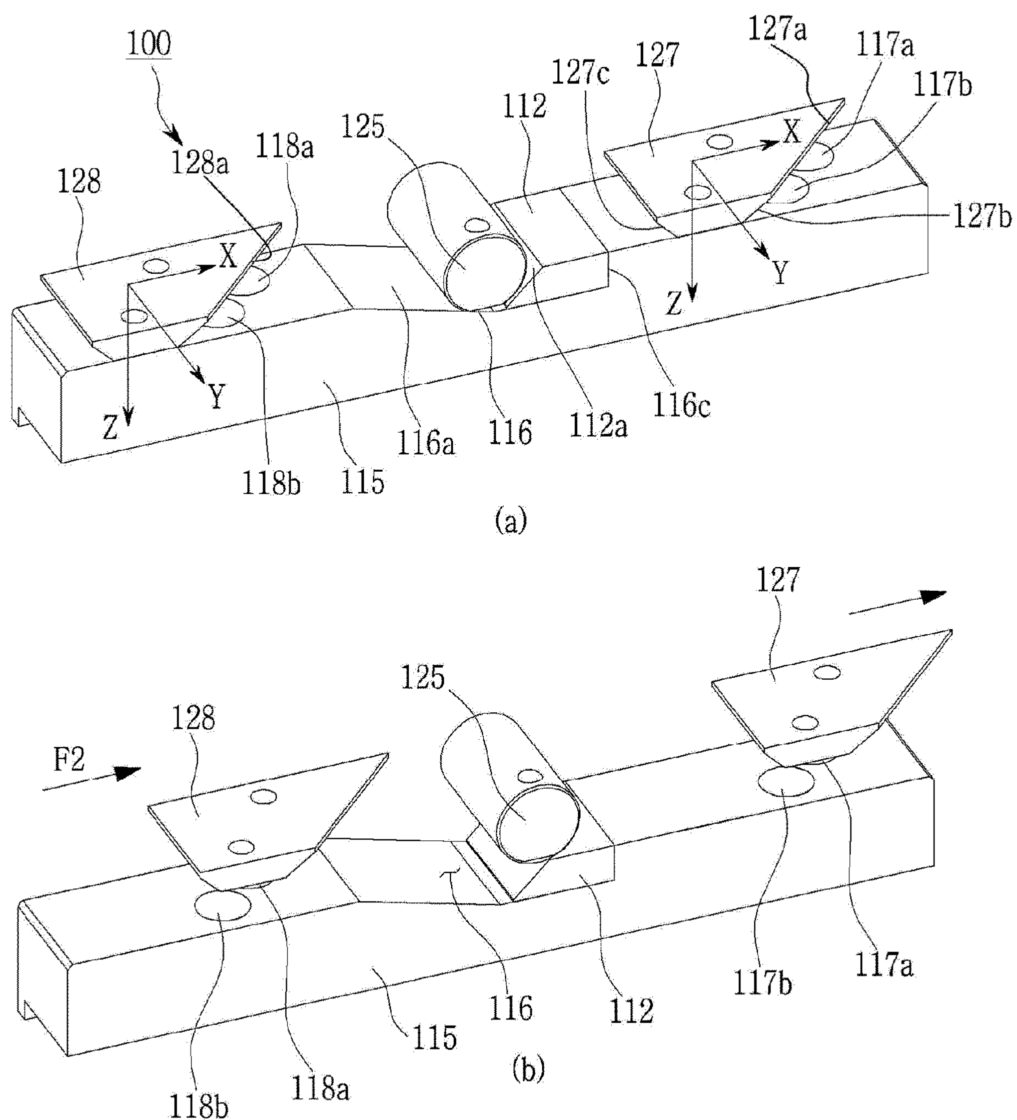

【FIG.8】
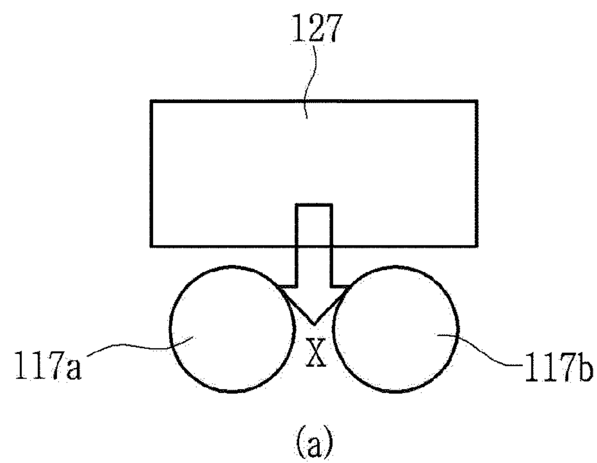
(a)
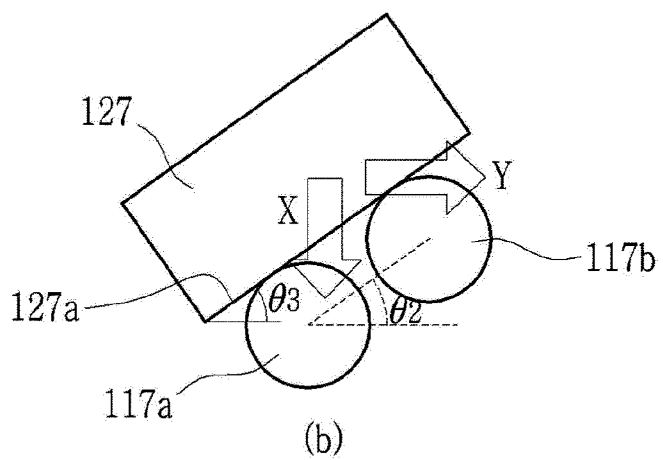
(b)
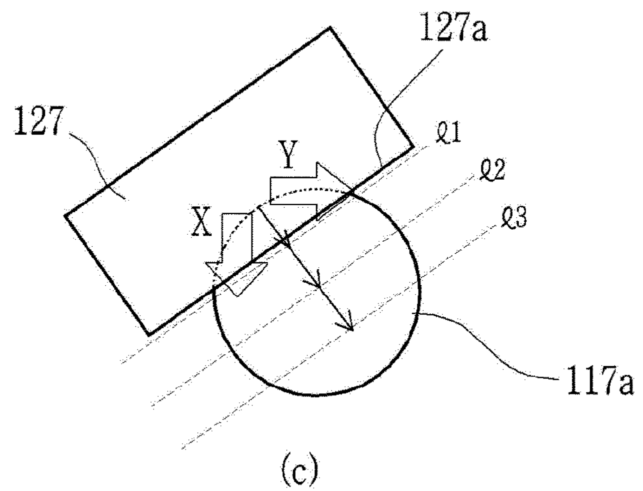
(c)

SHAPE MEASUREMENT DEVICE

TECHNICAL FIELD

The present disclosure relates to a shape measurement device, and more specifically, to a shape measurement device capable of preventing impact from being transmitted to a pivot by being easily removed along the X-axis, Y-axis, and Z-axis when impact is applied thereto.

BACKGROUND ART

A shape measurement device is a device that quickly and accurately measures the shape of an object to obtain three-dimensional spatial coordinates as shape information about the object. The shape measurement device is used to evaluate processing precision by comparing the result of shape measurement of a processed product or part with the designed shape dimensions, or used for reverse engineering of a product without design data such as drawings.

An exemplary shape measurement device is disclosed in Korean Patent No. 10-1546835 titled "SHAPE MEASUREMENT APPARATUS."

FIG. 1 is a perspective view showing the configuration of a conventional shape measurement device in the disclosed publication. As shown in the figure, the conventional shape measurement device includes a measurement arm support 10 and a measurement arm 20 detachably coupled to the measurement arm support 10.

Here, a pivot (not shown) for pivotably supporting a body coupling block 13 is provided in a coupling region between the body coupling block 13 and a support body 11. The measurement arm part 20 is moved along the X-axis and Y-axis while being coupled to the body coupling block 13 of the measurement arm support 10, and is rotated about the Z-axis by the pivot (not shown).

A stylus 27 provided at the end of the arm 25 is moved along an object to be measured. When impact is applied to the measurement arm 20 during measurement of the shape, the impact is transmitted to the pivot (not shown), causing damage to the pivot (not shown).

In order to address this issue, the conventional shape measurement device has a structure in which the measurement arm 20 and the measurement arm support 10 are coupled by magnetic force, and the measurement arm 20 is removed from the measurement arm support 10 when subjected to impact.

A front magnet **23*b* is provided on a front surface of a block accommodation groove 23*a*, and a side magnet 23*c* is provided on a side surface thereof. In addition, a front magnet coupling plate 13*b* is provided on the front surface of the body coupling block 13, a top magnet coupling plate 13*a* is provided on the top surface, and a side magnet coupling plate 13*c*** is provided on the side surface.

As shown in FIG. 2, the magnets **23*b*, 23*c* and 23*d* and the magnet coupling plates 13*b*, 13*c* and 13*a* arranged in three directions with the body coupling block 13 and the body 23** coupled to each other are coupled in place by magnetic force, and are separated when external force greater than the magnetic force is applied thereto.

In the conventional shape measurement device, since the body 23 is bent in an "¯|" shape, it is easily removed when external force is applied thereto in the Y-axis and Z-axis directions. However, when the force F2 directed toward the stylus 27 acts in the X-axis direction, the bent portion may hit the body coupling block 13 and thus fail to be removed, and the impact may be transmitted to the pivot (not shown).

In addition, since the magnets are arranged in three directions, the conventional shape measurement device may increase the cost of parts and takes a lot of time in connecting parts.

DISCLOSURE

Technical Problem

Therefore, the present disclosure has been made in view of the above problems, and it is one object of the present disclosure to provide a shape measurement device capable of preventing impact from being transmitted to a pivot by being easily removed from a measurement arm support when external force is applied regardless of the direction in which the force is applied.

It is another object of the present disclosure to provide a shape measurement device configured in a simple structure to reduce manufacturing cost.

The above objects and various advantages of the present disclosure will become more apparent to those skilled in the art from preferred embodiments of the present disclosure.

Technical Solution

The shape measurement device includes a stylus 131 configured to contact an object to be measured; a measurement arm 130 configured to support the stylus 131 to allow the stylus 131 to contact the object to be measured; a measurement arm part 120 configured to support the measurement arm 130; and a measurement arm support 110 configured to support the measurement arm part 120 to allow the stylus 131 to move along an outer shape of the object to be measured, wherein the measurement arm support 110 includes a support body 111 provided with a movement rail 113 formed on a top surface thereof, the measurement arm part 120 moving along the movement rail 113; a body coupling block 115 coupled to the movement rail 113 to move along the movement rail and detachably coupled to the measurement arm part 120, the body coupling block having a position-fixing groove 116 formed in a central area thereof; and a first magnet part 117 and a second magnet part 118 coupled to opposite sides of the body coupling block 115 in an embedded manner, wherein the measurement arm portion 120 includes a body 121 provided with a block accommodation groove 123 to accommodate the body coupling block 115; a position-fixing member 125 coupled to a lower surface of the body 121 defining the block accommodation groove 123, the position-fixing member being brought into contact with and supported by the position-fixing groove 116 when the body coupling block 115 is accommodated in the block accommodation groove 123; and a first magnet coupling plate 127 and a second magnet coupling plate 128 provided on opposite sides of the block accommodation groove 123 and coupled to the first magnet part 117 and the second magnet part 118 by magnetic force to couple the body 121 to the body coupling block 115.

According to one embodiment, opposite sides of the positioning groove 116 are provided with inclined surfaces having different inclination angles, wherein an inclined surface arranged to face the stylus 131 between the inclined surfaces has an inclination angle allowing the inclined surface to be circumscribed to the position-fixing member 125.

According to one embodiment, each of the first magnet part 117 and the second magnet part 118 includes a pair of magnets arranged along a longitudinal direction of the body coupling block 115 to be inclined at a predetermined angle; a metal plate coupled to a lower portion of the pair of magnets, wherein each of the first magnet coupling plate 127 and the second magnet coupling plate 128 has a tip facing the stylus 131, the tip being obliquely cut to form an horizontal inclined end, wherein opposite sides of each of the first magnet coupling plate 127 and the second magnet coupling plate 128 are provided with vertical inclined surfaces formed to be inclined in a vertical direction.

According to one embodiment, when the measurement arm part 120 is coupled to the body coupling block 115, each of the first magnet coupling plate 127 and the second magnet coupling plate 128 may be placed at a position within ⅓ to ½ of a total diameter of the magnets from a point where the horizontal inclined ends contact the magnets.

According to one embodiment, the position-fixing member may have a cross section having one of a circular shape, a polygonal shape, a spherical shape, or hemispherical shape.

Advantageous Effects

In a shape measurement device of the present disclosure, a body coupling block of a measurement arm support is coupled to a measurement arm part by the magnetic force of a first magnet part and a second magnet part disposed on the top surface thereof. Here, the first magnet part and the second magnet part each have a pair of magnets disposed to be inclined to apply magnetic force to the measurement arm part in the X-axis and Y-axis directions. Accordingly, the same effect as in the conventional device requiring arrangement of a plurality of magnets in different directions may be obtained.

In addition, since a position-fixing member of the measurement arm part is supported in contact with a position-fixing groove of the body coupling block in a circumscribing manner, the position along the X-axis may be fixed. Accordingly, even when opposite sides of the block accommodation groove are formed to be open, the position on the X-axis may be fixed, and the issue raised with the conventional block accommodation groove, which is formed in a "ᄀ" shape and is thus not removable in the X-axis direction, may be addressed.

Further, since the position-fixing member is designed to slide along the circumscribing inclined surface and an inclined surface when subjected to impact, damage to the surface of the body coupling block may be minimized.

DESCRIPTION OF DRAWINGS

FIG. 1 is an exploded perspective view showing a coupling structure of a conventional shape measurement device, FIG. 2 is an exemplary view showing a coupled state of the conventional shape measurement device, FIG. 3 is a perspective view showing a coupled state of a shape measurement device according to the present disclosure, FIG. 4 is an exploded perspective view showing a configuration of the shape measurement device according to the present disclosure, FIG. 5 is a perspective view showing the coupling structure of a measurement arm part and a body coupling block of the shape measurement device according to the present disclosure.

FIG. 6 is a cross-sectional view showing a cross-sectional configuration in a coupled state of the measurement arm part and the body coupling block of the shape measurement device according to the present disclosure FIGS. 7*a* and 7*b* are exemplary views illustrating a process of removing the measurement arm part when impact is applied to the shape measurement device of the present disclosure;

FIGS. 8*a*, 8*b*, and 8*c* are exemplary views illustrating a magnetic force application process of the shape measurement device of the present disclosure.

MODE FOR INVENTION

Hereinafter, preferred embodiments of the present disclosure will be described with reference to the accompanying drawings to provide thorough understanding of the present disclosure. The embodiments of the present disclosure may be modified in various forms, and the scope of the present disclosure should not be interpreted as being limited to the embodiments described in detail below. The embodiments are provided to more fully describe the present disclosure to those skilled in the art. Therefore, the shapes of the elements in the drawings may be drawn to scale for clearer description. It should be noted that the same members may be assigned the same reference numerals in the drawings. Detailed descriptions of well-known functions and elements will be omitted to avoid obscuring the subject matter of the present disclosure.

FIG. 3 is a perspective view showing a coupled state of a shape measurement device 100 according to the present disclosure. In the shape measurement device 100 according to the present disclosure, a stylus 131 coupled to a measurement arm 130 moves back and forth (along the X-axis), vertically (along a column-axis), and pivotably rotate (around the Z-axis) within a certain angle along the surface of an object to be measured to define the surface shape of the object to be measured with three-dimensional coordinates. The shape measurement device 100 according to the present disclosure includes a measurement arm support 110, a measurement arm part 120 detachably coupled to the measurement arm support 110 by magnetic force, and a measurement arm 130 coupled to the measurement arm part 120 to measure the shape of an object to be measured.

Although not shown in the figure, the shape measurement device 100 may further include a vertical shaft (not shown) to vertically move the measurement arm support 110.

The measurement arm support 110 is coupled to the vertical shaft (not shown) to move up and down and to support the measurement arm part 120 so as to move in the front-rear direction and pivotably rotate up and down. FIG. 4 is an exploded perspective view showing a configuration of the measurement arm support 110 and the measurement arm part 120. As shown in the figure, the measurement arm support 110 includes a support body 111, the movement rail 113 formed through the front of the support body 111 to guide movement of the measurement arm portion 120 along the X-axis, a body coupling block 115 movably coupled to the movement rail 113 and detachably coupled to the measurement arm part 120, and a block moving body coupling plate 119 coupled to a lower end of the body coupling block 115 to couple the body coupling block 115 to a block moving body 114.

The support body 111 is coupled to the vertical shaft (not shown) and moved in the vertical direction, that is, in the column-axis direction. The movement rail 113 is formed in the front surface of the support body 111 in a penetrated manner to extend a certain length along the X-axis to guide movement of the measurement arm part 120.

The movement rail 113 is provided with the block moving body 114. The block moving body 114 is coupled to the block moving body coupling plate 119 to provide driving force for moving the body coupling block 115 along the X-axis. The block moving body 114 is driven in connection with an X-axis driving source (not shown).

The block moving body 114 is provided with a pivot (not shown) such that the body coupling block 115 may pivotably rotate about the Z-axis.

The body coupling block 115 is coupled to the block moving body 114 through the movement rail 113. The body coupling block 115 is detachably coupled to the measurement arm 130 by magnetic force to support the measurement arm 130 so as to move along the X-axis and pivotably rotate about the Z-axis.

As shown in FIGS. 4 and 5, the body coupling block 115 includes a position-fixing groove 116 formed on the top surface thereof in a depressed manner, and a first magnet part 117 and a second magnet part 118 provided on opposite sides of the position-fixing groove 116.

The top surface of the body coupling block 115 is provided with a first magnet accommodating groove 115*a* and a second magnet accommodation groove 115*b*, to which the first magnet part 117 is coupled, and a third magnet accommodation groove 115*c* and a fourth magnet accommodation groove 115*d*, to which the second magnet part 118 is coupled.

The position-fixing groove 116 is formed to be recessed to a predetermined depth at the center of the top surface of the body coupling block 115. When the measurement arm part 120 is coupled to the body coupling block 115, the position-fixing groove 116 comes into contact with the position-fixing member 125 and thus serves to fix the coupling position.

The position-fixing groove 116 includes an inclined surface 116*a* formed to be inclined at a certain angle, a horizontal surface 116*b* formed horizontally in a direction away from the inclined surface 116*a*, and a vertical surface 116*c* formed perpendicular to the horizontal surface 116*b*. The inclined surface 116*a* forms an inclined angle to facilitate movement of the position-fixing member 125 when impact is applied. Accordingly, the position-fixing member 125 slidably moves along the inclined surface 116*a*.

Here, the position-fixing groove 116 may be changed to correspond to the shape of the position-fixing member 125. According to an exemplary embodiment of the present disclosure, when the position-fixing member 125 has a cylindrical shape, the position-fixing groove 116 may be formed as shown in the figures. However, when the position-fixing member 125 has a spherical shape, the position-fixing groove is formed in a hemispherical concave shape to allow a ball to be inserted thereinto and positioned.

A shaft contact block 112 is coupled to the horizontal surface 116*b* and the vertical surface 116*c*. One end of the shaft contact block 112 is positioned to contact the horizontal surface 116*b* and the vertical plane 116*c*. The opposite end of the shaft contact block 112 forms a circumscribing inclined surface 112*a*. The circumscribing inclined surface 112*a* contacts the position-fixing member 125 as shown in the enlarged section in FIG. 6. To easily fix the position of the position-fixing member 125, the inclination angle θ of the circumscribing inclined surface 112*a* is formed to circumscribe the surface about the position-fixing member 125.

Here, the opposite end of the position-fixing groove 116 is not provided with an inclined surface to be circumscribed directly to the position-fixing member 125, but is coupled to the shaft contact block 112. This is because the circumscribing inclined surface may be worn by repeated contact between the circumscribing inclined surface and the position-fixing member 125. The shaft contact block 112 is separately coupled to prevent wear of the circumscribing inclined surface due to continuous contact using a material having good wear resistance. This is because if the contact portion of the circumscribing inclined surface is worn, an error occurs due to a change in the measurement position.

The first magnet part 117 and the second magnet part 118 apply magnetic force to the first magnet coupling plate 127 and the second magnet coupling plate 128 of the measurement arm part 120 to keep the measurement arm part 120 coupled to the body coupling block 115.

The first magnet part 117 includes a first magnet 117*a*, a second magnet 117*b*, and a first metal plate 117*c* coupled to the lower portion thereof. The second magnet part 118 includes a third magnet 118*a*, a fourth magnet 118*b*, and a second metal plate 118*c* coupled to the lower portion thereof. As shown in the enlarged section in FIG. 6, the first magnet 117*a* and the second magnet 117*b* are arranged side by side such that the polarities thereof are opposite to each other. The first metal plate 117*c* is horizontally arranged under the first magnet 117*a* and the second magnet 117*b*.

Arranging the first metal plate 117*c* under the first magnet 117*a* and the second magnet 117*b* is intended to prevent the magnetic force applied by the pair of magnets from influencing the outside and to concentrate the magnetic force upward. That is, the arrangement is intended to apply relatively weak magnetic force downward to the side at which the first metal plate 117*c* is disposed, and magnetic force is concentrated and applied upward such that strong magnetic force acts on the first magnet coupling plate 127.

Thereby, the first magnet part 117 may be attracted to the first magnet coupling plate 127 with strong magnetic force, and thus the coupling constraint between the body coupling block 115 and the measurement arm part 120 may be improved.

The first magnet 117*a* and the second magnet 117*b* are arranged to be inclined at a certain angle along the longitudinal direction of the body coupling block 115. As shown in FIG. 8(*a*), when the first magnet 117*a* and the second magnet 117*b* are arranged side by side, the magnetic force acting on the first magnet coupling plate 127 is limited to be applied only along the X axis. On the other hand, as shown in FIG. 8(*b*), when the first magnet 117*a* and the second magnet 117*b* are disposed to be inclined at a certain angle θ2, the magnetic force is applied to each of the first magnet 117*a* and the second magnets 117*b* on the first magnet coupling plate 127, and thus magnetic force is applied in opposite directions of the X axis and the Y axis. Thus, the first magnet coupling plate 127 is attracted by strong magnetic force in the directions of the X-axis and the Y-axis simultaneously. Accordingly, coupling between the body coupling block 115 and the measurement arm part 120 may be maintained unlike the conventional shape measurement device of FIG. 1, which uses multiple magnets arranged in three directions of the front face, side face and top face. Since the second magnet part 118 is formed in the same structure as the first magnet part 117, detailed description thereof will be omitted.

The measurement arm part 120 is detachably coupled to the measurement arm support 110 by magnetic force and supports the measurement arm 130. The measurement arm part 120 includes a body 121 coupled to the body coupling block 115, a position-fixing member 125 coupled to a lower portion of the body 121, and a first magnet coupling plate

127 and a second magnet coupling plate 128 provided on opposite sides of the position-fixing member 125.

The body 121 is coupled to the measurement arm 130 and is detachably coupled to the body coupling block 115 to support the measurement arm 130 such that the measurement arm 130 moves along an object to be measured. An arm coupling hole 122 through which the measurement arm 130 is inserted is formed inside the body 121 in a penetrated manner.

A block accommodation groove 123 corresponding to the shape of the body coupling block 115 is formed on one side of the body 121. As shown in FIG. 3, the block accommodation groove 123 is coupled to the body coupling block 115, and thus the positions of the measurement arm support 110 and the measurement arm part 120 are fixed.

Here, the block accommodation groove 123 according to the present disclosure has a shape that is open on opposite sides. This is intended to address an issue related to the conventional measurement arm part 20 of FIG. 1 whose block accommodation groove 23*a* is formed in a "ᄀ" shape, thereby obstructing the measurement arm part 120 from being easily removed from the measurement arm support 110 when external force is applied in the X-axis direction.

The position-fixing member 125 is coupled to the lower surface of the body 121 defining the block accommodation groove 123 so as to protrude therefrom, and the first magnet coupling plate 127 and the second magnet coupling plate 128 are provided on opposite sides of the position-fixing member 125.

The position-fixing member 125 is horizontally coupled to the lower surface of the body 121. The position-fixing member 125 according to the preferred embodiment of the present disclosure is formed in a cylindrical shape, but this is merely an embodiment. The position-fixing member may be formed in the shape of a shaft having a circular or polygonal cross section, or may be formed in a hemispherical shape.

As shown in FIG. 6, when the measurement arm part 120 is coupled to the body coupling block 115, the position-fixing member 125 is brought into contact with and supported by the circumscribing inclined surface 112*a* of the shaft contact block 112. Thus, the position of the measurement arm part 120 is constrained in the X-axis direction.

The position-fixing member 125 has a circular cross-section. Thus, when external force is applied, the position-fixing member may slidably move along the circumscribing inclined surface 112*a* or the inclined surface 116*a*, and the body 121 may be easily removed from the body coupling block 115. Since the cross section of the position-fixing member 125 is circular, the position-fixing member moving in contact with the top surface of the body coupling block 115 may not damage the top surface.

The first magnet coupling plate 127 and the second magnet coupling plate 128 cause the body 121 to be fixed to the body coupling block 115 by magnetic force. The first magnet coupling plate 127 and the second magnet coupling plate 128 are formed in a trapezoidal shape that is inclined on one side.

As shown in FIG. 7(*a*), the first magnet coupling plate 127 is formed in a trapezoidal shape to have a horizontal inclined end 127*a* formed obliquely. In addition, the first magnet coupling plate 127 has vertical inclined surfaces 127*b* and 127*c* having an inclination angle in the thickness direction.

As shown in FIG. 8(*b*), the horizontal inclined end (127*a*) allows magnetic force to be uniformly applied in the X-axis and Y-axis directions when the body 121 is moved to the body coupling block 115 and is pulled by the magnetic force from the first magnet 117. To this end, the inclination angle θ3 of the horizontal inclined end 127*a* may be formed to be the same as the arrangement angle θ2 of the first magnet 117*a* and the second magnet 117*b*.

The vertical inclined surfaces 127*b* and 127*c* are formed to be inclined to allow the body 121 to be easily removed without affecting the pivot when colliding in the X-axis direction while moving to the left and right along the top surface of the body coupling block 115 in the X-axis direction.

As shown in FIG. 8(*c*), the first magnet coupling plate 127 coupled to the lower surface of the body 121 is designed to be placed at a position (l1) whose distance from the point where the horizontal inclined end 127*a* of the first magnet coupling plate 127 contacts the first magnet 117*a* and the second magnet 117*b* is ⅓ of the total diameter of the first magnet 117*a* and the second magnet 117*b* when the body 121 is coupled to the body coupling block 115.

In general, a magnet applies the greatest magnetic force when an object to be coupled thereto is at the ⅓ position l1. As the object is shifted from the ½ position l2 to the ⅔ position l3, the magnetic force applied thereto is weakened. That is, as the object is moved from the outside of the magnet to the inside, the force acting on the object is weakened.

Accordingly, when the first magnet coupling plate 127 is placed at the ⅓ position of the first magnet 117*a* and the second magnet 117*b* with the body 121 coupled to the body coupling block 115 at the right position, the first magnet coupling plate is pulled with the strongest force, thereby enhancing coupling.

The coupling position of the first magnet coupling plate 127 is equally applied to the second magnet coupling plate 128.

Here, regarding the magnetic force of the first magnet part 117 and the second magnet part 118 applied to the first magnet coupling plate 127 and the second magnet coupling plate 128, the magnetic force maintains coupling when the magnetic force is within a reference range of, for example, 4 to 12 g. When the magnetic force is beyond the reference range, for example, greater than or equal to 13 g, coupling is released, and the measurement arm part 120 is separated from the measurement arm support 110.

The measurement arm 130 is coupled to the measurement arm part 120 and moves along the shape of the object to be measured. The stylus 131 is provided to the front end of the measurement arm 130, and a weight 133 is provided at the rear of the measurement arm 130 to balance the measurement arm when the measurement arm is pivotably driven about the Z-axis by the pivot.

The operation of the shape measurement device 100 according to the present disclosure configured as described above will be described with reference to FIGS. 3 to 8.

In order to measure the shape of an object to be measured using the stylus 131, the body 121 of the measurement arm part 120 should be attached to the body coupling block 115 of the measurement arm support 110 as shown in FIG. 3.

As shown in FIG. 5, when an operator moves the body 121 toward the body coupling block 115, the first magnet part 117 and the second magnet part 118 pull the first magnet coupling plate 127 and the second magnet coupling plate 128 with magnetic force, and thus the block accommodation groove 123 of the body 121 is coupled with the body coupling block 115.

FIG. 6 is a cross-sectional view showing a cross-sectional configuration in a coupled state. As shown in the figure, the position-fixing member 125 is brought into contact with and circumscribed to the circumscribing inclined surface 112*a* of the shaft contact block 112 coupled to the position-fixing groove 116, and thus the position of the body 121 on the X-axis is fixed.

In this state, as shown in FIG. 7(*a*), the horizontal inclined end 127*a* of the first magnet coupling plate 127 is placed at a position whose distance from the point where the horizontal inclined end 127*a* contacts the first magnet 117*a* and the second magnet 117*b* is ⅓ of the total diameter of the first magnet 117*a* and the second magnet 117*b*. The second magnet coupling plate 128 is also placed at a position whose distance from the point where the horizontal inclined end 128*a* contacts the third magnet 118*a* and the fourth magnet 118*b* is ⅓ of the total diameter of the third magnet 118*a* and the fourth magnet 118*b*.

As the first magnet coupling plate 127 and the second magnet coupling plate 128 are disposed at the positions where the magnetic forces of the first magnet part 117 and the second magnet part 118 are greatest, coupling between the measurement arm support 110 and the measurement arm part 120 may be stably maintained.

Here, the first magnet 117*a* and the second magnet 117*b* are positioned to be inclined at a certain angle to pull the first magnet coupling plate 127 together in the X-axis and Y-axis directions to apply strong coupling force. The third magnet 118*a* and the fourth magnet also apply magnetic force to the second magnet coupling plate 128 in the X-axis and Y-axis directions.

In this way, the stylus 131 moves along the surface of the object to be measured to measure the shape thereof with the measurement arm part 120 coupled to the measurement arm support 110. Since the shape measurement process of the stylus 131 is the same as that of the conventional technology, detailed description thereof is omitted.

When an impact greater than the magnetic force applied by the first magnet part 117 and the second magnet part 118 is applied to the measurement arm 130 during the shape measurement process, the measurement arm part 120 is removed from the measurement arm support 110. As shown in FIG. 7(*b*), when force F2 is applied in the X-axis direction, the body 121 is separated from the body coupling block 115 while the position-fixing member 125 is slidably moved along the circumscribing inclined surface 112*a*.

In addition, when an opposite force is applied in the X-axis direction, the body 121 is separated from the body coupling block 115 while the position-fixing member 125 is moved along the inclined surface 116*a*.

In this process, the block accommodation groove 123 of the present disclosure may be separated without interfering with the body coupling block 115 because opposite sides thereof are open.

The removal process may be equally applied even when impact is applied in the vertical direction along the Y-axis or applied along the Z-axis direction. Accordingly, the shape measurement device 100 of the present disclosure may prevent impact from being transmitted to the pivot by causing the measurement arm part 120 to be separated from the measurement arm support 110 regardless of the direction in which the impact is applied.

As described above, the shape measurement device of the present disclosure is coupled to the measurement arm part by the magnetic force of the first magnet part and the second magnet part disposed on the top surface of the body coupling block of the measurement arm support. In this state, the first magnet part and the second magnet part apply magnetic force to the measurement arm in the X-axis and Y-axis directions through a pair of magnets, which are disposed inclined. Accordingly, the same effect as obtained in the conventional case requiring arrangement of a plurality of magnets in different directions may be exhibited.

In addition, since the position-fixing member of the measurement arm part is brought into circumscribing contact with and supported by the position-fixing groove of the body coupling block, the position thereof on the X-axis is fixed.

Accordingly, even when opposite sides of the block accommodation groove are formed to be open, the position on the X-axis may be fixed, and the issue raised with the conventional block accommodation groove, which is formed in a "ㄱ" shape and is thus not removable in the X-axis direction, may be addressed.

Further, since the position-fixing member is designed to slide along the circumscribing inclined surface and an inclined surface when subjected to impact, damage to the surface of the body coupling block may be minimized.

The embodiments of the shape measurement device of the present disclosure described above are merely exemplary, and it will be well understood by those skilled in the art that various modifications and other equivalent embodiments are possible. Therefore, it will be understood that the present disclosure is not limited to the forms mentioned in the above detailed description. Therefore, the true technical scope that is sought by the present disclosure should be determined by the technical spirit of the appended claims.

It is also to be understood that the present disclosure covers all modifications, equivalents, and substitutes within the spirit and scope of the disclosure as defined by the appended claims.

REFERENCE NUMERALS

100: Shape measurement device 110: Measurement arm support
111: Support body 112: Shaft contact block
112*a*: Circumscribing inclined surface
113: Movement rail 114: Block moving body
115: Body coupling block 115*a*: First magnet accommodation groove
115*b*: Second magnet accommodation groove 115*c*: Third magnet accommodation groove
115*d*: Fourth magnet accommodation groove 116: Position-fixing groove
116*a*: Inclined surface 116*b*: Horizontal surface
116*c*: Vertical surface 117: First magnet part
117*a*: First magnet 117*b*: Second magnet
117*c*: First metal plate 118: Second magnet part
118*a*: Third magnet 118*b*: Fourth magnet
118*c*: Second metal plate 119: Block moving body coupling plate
120: Measurement arm part 121: Body
122: Arm coupling hole 123: Block accommodation groove
125: Position-fixing member 127: First magnet coupling plate
127*a*: Horizontal inclined end 127*b*, 127*c*: Vertical inclined surface
128: Second magnet coupling plate 130: Measurement arm
131: Stylus 133: Weight

The invention claimed is:

1. A shape measurement device comprising:
a stylus configured to contact an object to be measured;
a measurement arm configured to support the stylus to allow the stylus to contact the object to be measured;

a measurement arm part configured to support the measurement arm; and a measurement arm support configured to support the measurement arm part to allow the stylus to move along an outer shape of the object to be measured, wherein:

the measurement arm support includes:

a support body provided with a movement rail formed on a top surface thereof, the measurement arm part moving along the movement rail;

a body coupling block coupled to the movement rail to move along the movement rail and detachably coupled to the measurement arm part, the body coupling block having a position-fixing groove formed in a central area thereof; and a first magnet part and a second magnet part coupled to opposite sides of the body coupling block in an be embedded manner, and the measurement arm portion includes:

a body provided with a block accommodation groove to accommodate the body coupling block;

a position-fixing member coupled to a lower surface of the body defining the block accommodation groove, the position-fixing member being brought into contact with and supported by the position-fixing groove when the body coupling block is accommodated in the block accommodation groove; and a first magnet coupling plate and a second magnet coupling plate provided on opposite sides of the block accommodation groove and coupled to the first magnet part and the second magnet part by magnetic force to couple the body to the body coupling block;

opposite sides of the positioning groove are provided with inclined surfaces having different inclination angles; and an inclined surface arranged to face the stylus between the inclined surfaces has an inclination angle allowing the inclined surface to be circumscribed to the position-fixing member.

2. The shape measurement device of claim 1, wherein:

each of the first magnet part and the second magnet part comprises:

a pair of magnets arranged along a longitudinal direction of the body coupling block to be inclined at a predetermined angle; and a metal plate coupled to a lower portion of the pair of magnets, each of the first magnet coupling plate and the second magnet coupling plate has a tip facing the stylus, the tip being obliquely cut to form an horizontal inclined end, and opposite sides of each of the first magnet coupling plate and the second magnet coupling plate are provided with vertical inclined surfaces formed to be inclined in a vertical direction.

3. The shape measurement device of claim 2, wherein, when the measurement arm part is coupled to the body coupling block, each of the first magnet coupling plate and the second magnet coupling plate is placed at a position within ⅓ to ½ of a total diameter of the magnets from a point where the horizontal inclined ends contact the magnets.

4. The shape measurement device of claim 3, wherein the position-fixing member has a cross section having one of a circular shape, a polygonal shape, a spherical shape, or hemispherical shape.

5. The shape measurement device of claim 2, wherein the position-fixing member has a cross section having one of a circular shape, a polygonal shape, a spherical shape, or hemispherical shape.

6. The shape measurement device of claim 1, wherein the position-fixing member has a cross section having one of a circular shape, a polygonal shape, a spherical shape, or hemispherical shape.

* * * * *